Feb. 16, 1954          W. G. PFANN          2,669,635
SEMICONDUCTIVE PHOTOELECTRIC TRANSDUCER
Filed Nov. 13, 1952          2 Sheets-Sheet 1
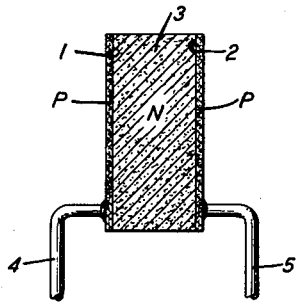
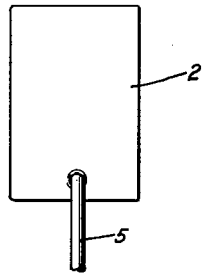
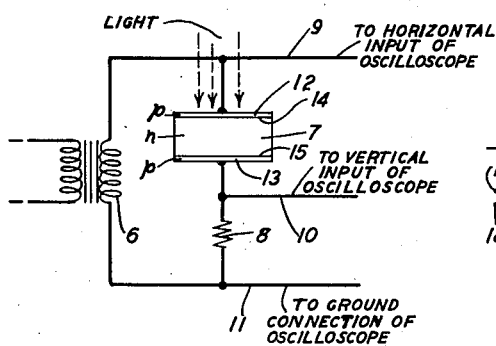
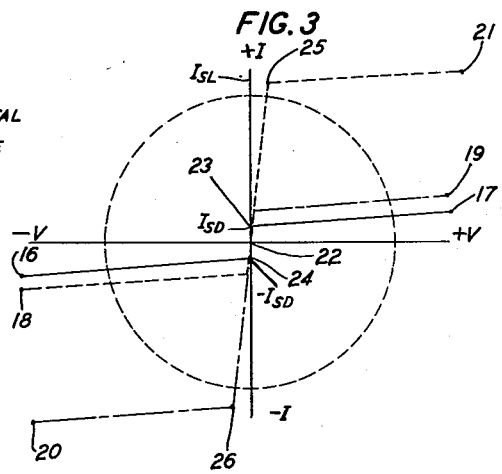
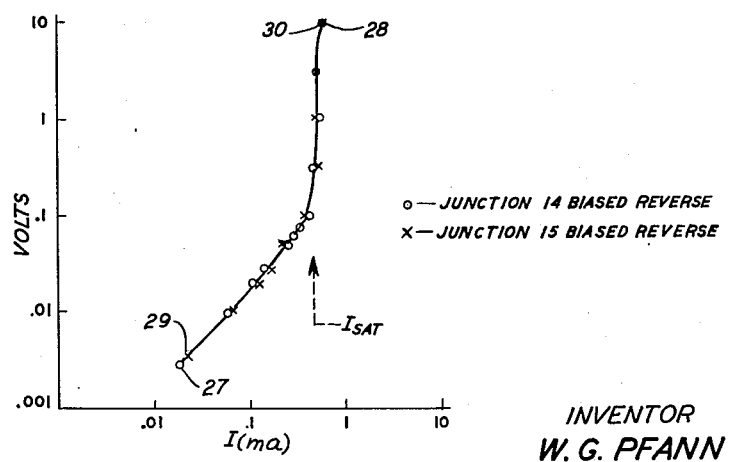
INVENTOR
W. G. PFANN
BY
ATTORNEY

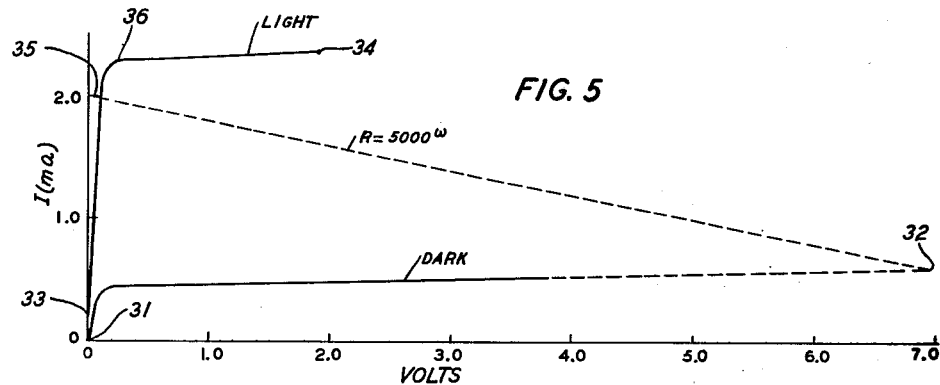
FIG. 5
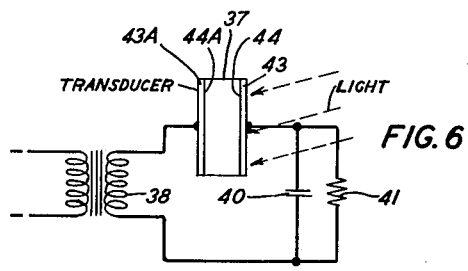
FIG. 6
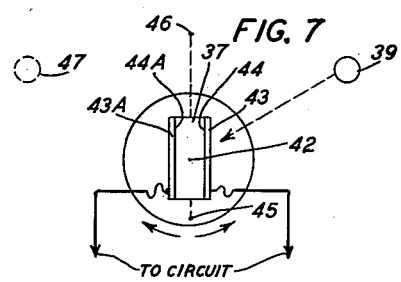
FIG. 7
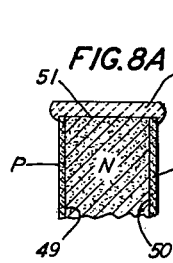
FIG. 8A
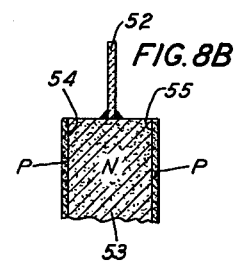
FIG. 8B
FIG. 8C
FIG. 8D
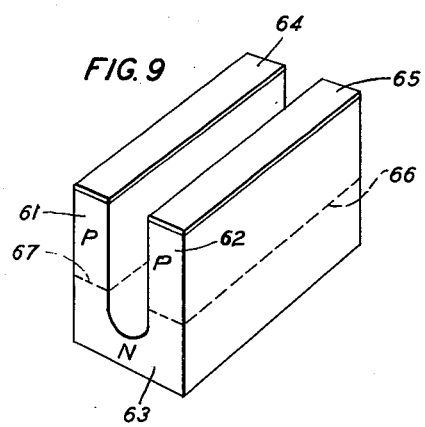
FIG. 9
FIG. 8E
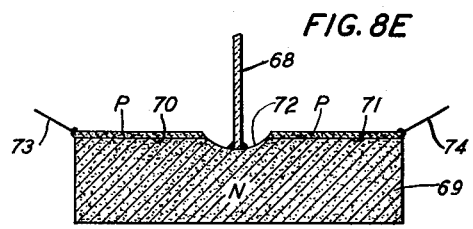
INVENTOR
W. G. PFANN
BY
Edwin B. Cave
ATTORNEY Patented Feb. 16, 1954

2,669,635

UNITED STATES PATENT OFFICE 2,669,635

SEMICONDUCTIVE PHOTOELECTRIC TRANSDUCER

William G. Pfann, Basking Ridge, N. J., assignor to Bell Telephone Laboratories, Incorporated, New York, N. Y., a corporation of New York Application November 13, 1952, Serial No. 320,317

6 Claims. (Cl. 201—63)

This invention relates to light responsive electrical devices and more particularly to such devices wherein the active element is a body of semiconductive material containing at least two PN boundaries.

A feature of the devices to be described is that they may be alternating-current biased and that they are sensitive to the position and direction of the source of energy which is used to activate them. This energy may be light in a visible spectrum, it may be of a greater wavelength extending into the infra-red spectrum, or may extend into the high frequency X-ray and γ-ray range. It will be understood that the term "light" is not intended to be limited to the visible spectrum, but is intended to cover all wavelengths which may be used to energize all devices to be described.

All of the devices to be described have two regions of like conductivity type and an intermediate region of opposite conductivity type and have the following quality in common. When a device of this invention is in the dark, both barriers have a high reverse resistance and the device is of high resistance for either polarity. If one of these two regions of like conductivity is illuminated by light of a suitable frequency, the consequent generation of hole-electron pairs has the effect of decreasing the reverse resistance of the PN barrier closest to that region. Since, however, the configuration of the devices to be described is such that the second barrier remains substantially unaffected, the device is now rectifying. Illuminating the other region of like conductivity type while keeping the first region in the dark, produces a rectifying action of opposite polarity. If both regions of like conductivity type are illuminated with an equal amount of energy absorbed by each, the resistance is symmetrical, but of a much lower value than that of the device in the dark.

It is apparent that the devices of this invention, because of their directional sensitivity, may be utilized in many types of directional apparatus, such as for example, servo mechanisms. Such uses will be described.

In one illustrative embodiment of this invention, the sensitive element consists of a body of semiconductive material, such as for example, a semiconductive material of Group IV from the Periodic Table according to Mendelyeev, such as silicon or germanium. The configuration of this semiconductive body is that of a sandwich of either two P regions with an N region contiguous to both and intermediate the two, or alternately may consist consecutively of N, P and N-type regions.

The types of conductivity in each of the regions of devices containing silicon or germanium is produced by controlling the amounts of significant impurities present in each. These "significant impurities" which are the one cause of extrinsic conductivity in such semiconductive materials have been amply covered elsewhere. See, for example, my copending application Serial No. 256,791, filed November 16, 1951. Briefly these significant impurities include the P-type elements boron, aluminum, gallium and indium of Group III and the N-type elements phosphorus, arsenic, antimony and bismuth of Group V of the Periodic Table according to Mendelyeev. It is not intended to discuss methods of producing N and P-type regions in the construction of the devices herein to be described, since it is believed that the semiconductor art is sufficiently advanced and that satisfactory methods are well known to those skilled in the art.

In one embodiment of this invention, the outer regions of like conductivity type, either P or N, are kept very thin, in the order of mils or less in thickness. As will be fully described the actual dimensions of these outer regions depends on two factors to wit: the degree of transparency of these outer regions to the wavelength of light which is used to energize them, and secondly, to the lifetimes of the minority carriers which are generated within these regions by the light. With devices built according to the critical specifications of this invention, it is possible to activate either boundary simply by directing the light against any part of the outer regions. By so doing, two advantages are realized: the amount of active surface area is not limited to the region immediately adjacent the intersection of the PN boundary with the outer surface, so that a much larger active surface area is presented and so that critical focussing of the light beam is not necessary. Secondly, when the light is directed at substantially a right angle to the outer region the intermediate region of the other conductivity type presents a formidable obstacle to the activation of the opposite boundary.

The invention can be better understood by reference to the drawings in which:

Fig. 1A is a front elevation in section of one illustrative type of photoelectric transducer constructed in accordance with this invention;

Fig. 1B is a side elevation of the same device;

Fig. 2 is a diagram of a circuit by means of which current-voltage characteristics of the device shown in Figs. 1A and 1B may be displayed on an oscilloscope;

Fig. 3 is a graph of current against voltage obtained from the circuit of Fig. 2 using the device of Figs. 1A and 1B;

Fig. 4 is a log-log plot of voltage against current of characteristics obtained from an actual PNP transducer such as that shown in Figs. 1A and 1B;

Fig. 5 is an arithmetic plot of current against voltage showing both a dark and a light characteristic curve for one PN junction of the device of Figs. 1A and 1B;

Fig. 6 is a diagram of an illustrative circuit using one of the devices herein to be described;

Fig. 7 is a plan view of a device such as that shown in Figs. 1A and 1B, but mounted on a shaft so as to be free to rotate and seek out the light source shown;

Figs. 8A, 8B, 8C, 8D and 8E are plan views, in section, of one end of devices similar to that shown in Figs. 1A and 1B, but which devices are modified so as to minimize the possibility of stray light reaching the junction opposite the one towards which the source is directed;

Fig. 9 is a perspective view of a PNP transducer configuration alternative to that shown in Figs. 1A and 1B.

Referring to Figs. 1A and 1B, the semiconductive element depicted is a two-electrode PNP configuration. Thin P-type layers 1 and 2 of the order of mils or less in thickness, are formed on two opposite faces of a body of N-type material leaving a relatively thick intermediate N region 3. Non-rectifying contacts 4 and 5 are made respectively to outer regions 1 and 2 in such manner as to leave most of faces 1 and 2 exposed. The device may be made of any semiconductive material, such as for example, silicon or germanium.

Fig. 1B is an end view of the same device showing outer region 2 and non-rectifying contact or electrode 5.

In Fig. 2, transformer 6 supplied from a 60-cycle alternating-current source (not shown) produces an alternating bias across transducer 7. Load resistor 8 in series with the transducer 7, and transformer 6, completes the circuit. Horizontal lead 9, vertical lead 10, and ground lead 11 are all connected to an oscilloscope (not shown). The results obtainable on such a circuit are discussed in connection with Fig. 3 which is an arithmetic plot of current I against voltage V for the device 7 of Fig. 2. The curves of Fig. 3 are illustrative of those which may be observed on an oscilloscope to the horizontal input, vertical input and ground connections of which leads 9, 10 and 11 of Fig. 2 are respectively connected.

With transducer 7 in the dark, curve 16—22—17 is obtained. This curve represents a symmetrical impedance of a high value. The line 23—22—24 represents the range of absolute values of current below that of $I_{SD}$, the saturation current of the device in the dark and represents a region of relatively low impedance. The absolute value of $I_{SD}$ is of the range of 0.45 milliampere for the particular device tested. $I_{SD}$ may be of a value of about 0.001 milliampere for better junctions in germanium and much less in silicon.

If face 12 of transducer 7 of Fig. 2 is illuminated keeping face 13 in the dark so that the hole-electron pairs are generated in the vicinity of PN boundary 14, curve 18—22—21 is obtained (+V being the polarity for which PN junction 14 nearest face 12 is biased in the reverse direction). The curve 18—22—21 is asymmetric. If the encircled region only is considered, it is readily apparent that the transducer is rectifying, the low resistance polarity being face 12 positive with respect to face 13.

If face 13 is illuminated so that hole-electron pairs are generated in the vicinity of PN junction 15 and if region 12 is kept in the dark so that there is no generation of carriers in the vicinity of PN junction 14, curve 20—22—19 is obtained. This represents a counterclockwise flow of electrons through device 7 and indicates that the device is a rectifier of opposite polarity.

If both faces 12 and 13 are illuminated equally, curve 20—22—21 is produced. This represents a comparatively low impedance and substantially equal flow of current in both directions. Under these conditions the device is not rectifying but rather is of the nature of a resistor. If the absolute value of the voltage corresponding with the saturation current of boundary 14 or 15 when absorbing any given amount of light energy, $I_{SL}$ (points 25 and 26), is exceeded in either direction, the impedance to additional current flow in that direction increases sharply. Under this condition the total electron flow across the transducer equals the total number of generated electrons which reach barrier 14 in one direction and 15 in the other. The absolute value of this limiting current, since it is dependent upon the number of electrons generated within regions 12 or 13 which reach adjacent barriers 14 or 15, is dependent on the total number of hole-electron pairs generated and, therefore, dependent upon the intensity of the light absorbed by either of regions 12 or 13.

Theoretically, it would appear that the number of generated hole-electron pairs could be increased by increasing the intensity of the light until there is one pair generated for each molecule present in the portion of the body illuminated. In practice this limiting condition would be of little importance, not only because a light source of that great intensity is not readily available, but more important, because of the difficulty of heat dissipation. Increasing the intensity of the source increases the temperature of the element partly due to radiant effects and partly due to electron activity. As the temperature increases more and more hole-electron pairs are thermally excited in both regions of like conductivity type thereby reducing the back resistance of both barriers. Such a random generation decreases the positional sensitivity of the device. It follows that the positional sensitivity of the devices herein described may be improved by keeping them at reduced temperatures.

Fig. 4 which is a log-log plot of voltage against current, the former in volts and the latter expressed in milliamperes, indicates the degree of symmetry of dark voltage-current characteristics obtainable in such a transducer. The significance of symmetry will be discussed below in connection with Figs. 6 and 7. Curve 27—28 which is drawn through the encircled points is plotted for the condition in which junction 14 of Fig. 2 is biased in the reverse direction, that is, P region 12 negative in respect to N region 7. This curve corresponds with curve 22—17 of Fig. 3. Curve 29—30 which is drawn through the X symbols corresponds with curve 22—16 of Fig. 3 and represents that part of the cycle in which junction 15 of the device of Fig. 2 is biased in the reverse direction. Since Fig. 4 is a plot of absolute values of voltage and current and since the device exhibits a symmetrical impedance in both directions, it is seen that the curves coincide. As noted from this figure, the saturation current for the device in the dark corresponding with points 23 and 24 on Fig. 3 is of an absolute value of about 0.45 milliampere which further corresponds with an approximate resistivity value of 11 milliamperes/cm.$^2$. As will be discussed further on, this value of resistivity is not a limiting value but, rather, is several times greater than values of junctions now available.

Fig. 5 on coordinates of current in milliamperes against voltage in volts is a plot of the characteristic of one junction in the dark and of the same junction when lighted. Curve 31—32 was obtained from data taken from a circuit such as that of Fig. 2 with junction 14 biased in the reverse direction and with face 12 unlighted. This curve corresponds with curve 22—17 of Fig. 3. Curve 33—34 of Fig. 5 results when face 12 of the device of Fig. 2 is illuminated with barrier 14 biased in the reverse direction. By utilizing load line 32—25 representing a 5000-ohm resistor connected in series with the transducer and a 10-volt source, it may be seen that illuminating P region 12 results in a voltage swing of almost 7 volts. As explained in connection with the description of Fig. 3, the limiting value 36 of current (about 2.35 milliamperes) may be increased by increasing the intensity of the light striking the P region closest to the barrier under consideration, so that the voltage swing may be increased to values well above 7 volts by increasing the intensity of the light. The voltage swing may also be increased by increasing the value of the resistance in series with the transducer or by increasing the bias voltage.

It will be noted that curves 31—32 and 33—34 of Fig. 5 do not coincide at the origin, a current of about 0.20 milliampere being indicated at zero voltage for light curve 33—34. This may be ascribed to the photovoltage generated by the field of the PN barrier upon illumination. The data of Figs. 4 and 5 are taken from an experimental model and are of value chiefly for the curve shapes and not for the actual values presented. With improved PN junctions which have lower values of saturation current and which, therefore, show greater response to illumination, improvement of several factors of 10 over that indicated in Figs. 4 and 5, may be obtained.

Figs. 6 and 7 will be considered together since Fig. 6 is a diagram of an electrical circuit in which the mechanical configuration depicted in Fig. 7 is utilized. In this arrangement transducer 37 is connected in series with alternating-current source 38 and parallel network consisting of load 41 and capacitance 40. This transducer 37 is mounted on a shaft rotatable about an axis through point 42 and perpendicular to the plane of the drawing. The shaft in turn is geared to a direct-current motor represented electrically on Fig. 6 as load 41 and not shown on Fig 7. Light source 39 is shown in a position oblique to the plane of the transducer 37. The input to the motor may be electrically connected to the circuit of Fig. 6 through a direct-current amplifier whose input resistance is represented by the load resistance 41 in Fig. 6. The direction of rotation of the motor depends upon the polarity of the direct-current voltage across load 41. When the faces of the transducer are not illuminated, the direct-current voltage component in the load 41 is negligible because of the symmetry shown in Fig. 4 as discussed above.

When the light strikes only face 43 thereby generating hole-electron pairs in the vicinity of barrier 44 and thereby reducing the back resistance of that barrier, the device allows a net electron flow in a counter-clockwise direction through load 41. The direct-current voltage thereby generated causes the direct-current motor to rotate transducer 37 about axis 42 until the plane 45—46 of the transducer approaches alignment with light source 39. A light source at position 47 has the effect of generating hole-electron pairs in region 43A and in the vicinity of PN barrier 44A so that electron flow of the opposite direction is made to pass through load 41. A direct-current voltage of opposite polarity is thereby impressed across load 41 causing the motor to rotate in the other direction and bringing plane 46 of the transducer into alignment with position 47. The over-all effect of the mechanical coupling shown in Fig. 7 as operated in the circuit of Fig. 6, is a device which will seek out the position of a source of illumination or which, more generally, will seek out a position such that the intensity of absorbed light on either of faces 43 and 43A is equal. This may, for example, be a midway point between two equal intensity light sources placed equidistant from the transducer.

With a transducer having the characteristics shown in the plot of Fig. 5 in the circuit of Fig. 6 and with a value of 8 microfarads for the capacitor 40, a value of 5,000 ohms for the load resistance 41 with a 60-cycle per second 6-volt R. M. S. voltage supplied by A. C. source 38, a rectified voltage of 1.1 volts is developed across load 41 when one face is illuminated with a pocket flashlight.

The photomechanical illustration depicted in Figs. 6 and 7 emphasizes certain features of the PNP photo-transducer:

1. Direct-current voltages sufficient to cause a direct-current motor to turn over may be generated using a simple and common source of alternating-current power and a light source of only moderate intensity.

2. The polarity of the direct-current voltage generated across load 41 depends only upon which face is illuminated and may be reversed readily by moving the light source or by rotating the transducer about its axis.

3. The phototransducer as used in the circuit of Fig. 6 has a "directional" as distinguished from "positional" sensitivity to the position of the light source. For an example of a phototransducer containing two PN boundaries in series opposition which is positional but not directional, see J. N. Shive, United States Patent No. 2,641,713, issued June 9, 1953. Due to the configuration described in the aforesaid patent, varying the position of the light source has the effect of increasing or decreasing the magnitude of the generated direct current, but since the middle region in the device there described is limited to the order of the diffusion length of the generated minority carriers, both barriers are always effective and the direction of the resultant rectified current is always the same. Such a device is not as well adapted for seeking out a light source.

Figs. 8A, 8B, 8C, 8D and 8E are illustrative of modifications of the device depicted in Figs. 1A and 1B designed to further enhance the directional aspect of the devices here described.

In Fig. 8A, shield 48, which may be made of any material opaque to the wavelength of light used, shields the intersections of PN barriers 49 and 50 with surface 51 from the light source, so that the possibility of any random light generating a voltage in a direction opposite to that which is desired is minimized.

In Fig. 8B the shield 52 takes the form of a projection from the center region 53 so that the barrier, for example 54, opposite from the light source intended to generate carriers in the vicinity of barrier 55, is in shadow.

In Fig. 8C the same result is achieved by merely tapering the entire device thereby forming point 56 and once again decreasing the probability of incident light striking, for example, barrier 57 if the light is directed so as to produce minority carriers in the vicinity of barrier 58.

In Fig. 8D the same result is achieved by rounding all the edges of the transducer. This also has the effect of increasing the directional sensitivity of the transducer so that if light is directed at PN barrier 59, projecting portion 60 will keep barrier 61 in shadow over a larger arc of travel either of the transducer or of the light source. The modifications of Figs. 8A through 8D are merely illustrative.

In Fig. 8E shield 68 makes possible the manufacture of an efficient PNP phototransducer from an N-type body 69 containing only one P layer. Grinding groove 72 through the P and into the N region across the width of the entire body produces two P regions 70 and 71 with N region 69 intermediate the two electrically. Contact to the P regions may be made at positions 73 and 74. The considerations to be taken into account in determining the thickness of P regions 70 and 71 are similar to those which will be discussed in connection with P regions 1 and 2 of Fig. 1.

Fig. 9 is a perspective view of a structure which has some of the characteristics of the devices of the preceding figures. To construct this device a block of semiconductive material containing one PN boundary is ground in the shape of a horseshoe so that the hollow projects through the boundary for the entire length of the boundary in one direction. By this means a device is produced containing P regions 61 and 62 and N region 63. If large area electrodes 64 and 65 are formed on the two legs of the horseshoe, the resultant device will behave as a PNP transducer. The light-sensitive regions are the intersections 66 and 67 of the two PN barriers with the surfaces of the element. Such a device does not have a large area available as do the thin region elements of Figs. 1A, 1B, 8A, 8B, 8C, 8D and 8E. In this type of phototransducer light must be directed to within the range of one or two diffusion lengths of intersections 66 or 67. Such a device is usable in any of the circuits discussed in this specification.

A discussion of some of the considerations which must be taken into account in constructing a device such as that shown in Figs. 1A and 1B follows. The essential features to be considered are the relative thicknesses of the P and the N layers and the frequency spectrum of the illumination. First, the wavelength must be short enough to produce hole-electron pairs and second, the depth of penetration of the light should be such that these hole-electron pairs are generated sufficiently close to one barrier and at sufficient distance from the other so that the result will be a maximum generation of minority carriers in the vicinity of one boundary and a minimum in the vicinity of the other.

It has been stated that the devices of this invention are sensitive to wavelengths of light ranging from the infra-red down to the X-ray and γ-ray range. The maximum wavelength and therefore the minimum energy of light which may be used to activate any of the devices herein described, depends on the semiconductive material of which the device is constructed. It is necessary to have a light with a photon energy at least equal to the forbidden bandwidth. In germanium, the average forbidden bandwidth, that is, the average energy necessary to lift a minority carrier into the conducting range, is about 0.7 electron volt. This corresponds to a wavelength of from 1.7 to 1.8 microns. This value corresponds with a light in the middle range of the infra-red spectrum. Since, however, this value is an average, it is to be expected that it will be possible to activate hole-electron pairs with photons containing somewhat less than the energy represented by the average bandwidth, although in decreasing number, as the wavelength of the light is increased. Significant generation has been observed for light having wavelengths of upwards of 2.1 microns.

Temperature has an effect on the average bandwidth of the forbidden region so that decreasing temperature results in increasing bandwidth and thereby has the effect of lowering the maximum wavelength which will excite the device. Increasing temperature has the effect of decreasing the bandwidth and, therefore, of increasing the wavelength of light which may be used.

The average bandwidth of the forbidden region in silicon is about 1.12 electron-volts corresponding with a wavelength of light of about 1.2 microns (somewhat lower than that for germanium), although, as in germanium, generation of hole-electron pairs is expected with decreasing efficiency with light sources having photon energies of less than 1.12 electron-volts. Here again increasing the temperature of the transducer has the effect of increasing the energy of the electrons and, therefore, of lowering the minimum energy necessary to bridge the forbidden region so that the device may be activated with a light source having a wavelength greater than 1.2 microns.

The two chief considerations to be taken into account in determining the thickness of the regions of like conductivity type in, for example, the transducer depicted in Figs. 1A and 1B are:

1. The depth of penetration of the light.
2. The diffusion length of the generated carriers.

In semiconductors of the nature of germanium and silicon, the depth of penetration of light becomes significant only in the infra-red range. Below this range of wavelengths, in the visible spectrum and in the X-ray and γ-ray range it may be assumed that the generation of holes and electrons will take place only at the incident surface, the depth of penetration below the infra-red being of the order of a micron or less. The depth of penetration, however, is a factor which must be taken into account in the lower frequency infra-red range since the danger exists that the center region between the two regions of like conductivity type may be substantially transparent to this range of wavelength and so that the effect of shining a light toward one surface or the other will cause a generation of hole-electron pairs in the vicinity of both boundaries. In such a situation the effective directional flow of current across the device will not be substantially equal to the number of generated carriers which reach the boundary immediately adjacent the region toward which the light is shown, but will be this value less the number of carriers generated in the vicinity of the opposite boundary.

The above minus quantity may be significant, for example, where an infra-red light source of 1.8 microns wavelength is used with germanium. The absorption distance of light of this wavelength is $10^{-1}$ centimeters or about 40 mils. Since this absorption distance is defined as the depth of penetration to which $$\frac{1}{e}$$

photons penetrate, it is apparent that for an N-type device having very thin P regions and of a total thickness of 0.1 centimeter, there will be a generation of approximately half as many carriers causing current flow in a direction opposite to that which is intended. In this frequency range, it is suggested that where the P regions are of the order of only a very few mils in thickness, the thickness of the N region be at least two diffusion lengths. Where the light source has a wavelength of 1.8 microns, a center region of approximately 0.2 centimeter is indicated for germanium having a lifetime of 100 microseconds or less. This would result in an electron flow of a factor eight times greater in the desired direction as in the reverse direction.

The depth of penetration in germanium drops off rather rapidly, however, so that for a wavelength of about 1.5 microns, the depth of penetration is little more than 0.001 centimeter or approximately 0.4 mil.

The other consideration to be taken into account in determining the optimum thicknesses of the three regions of a device such as that depicted in Figs. 1A and 1B, is the diffusion length of the generated carriers, that is, the maximum distance from the PN boundaries at which a generation of hole-electron pairs will result in $$\frac{1}{e}$$

minority carriers reaching the boundary. Where the frequency range of the light source is that of the visible spectrum or higher so that it may be considered that the hole-electron pairs are generated directly at the incident surface, it is advisable that the outer regions have a thickness no greater than one diffusion length. Since a diffusion length is also defined as that distance through which $$\frac{1}{e}$$

the generated carriers will travel, a thickness equal to the diffusion length will result in only slightly fewer than one-third of the generated minority carriers reaching the barrier. Increasing the thickness of the outer regions of like conductivity type results in the penetration of only $$\left(\frac{1}{e}\right)^n$$

minority carriers where $n$ is the number of diffusion lengths. Where the thickness is two diffusion lengths only about one-eighth of the generated carriers will produce electron flow across the transducer. It should, however, be kept in mind that the discussion relating to diffusion length is on the assumption of surface generation of carriers and random travel thereafter. If generation occurs within the body, diffusion lengths are shorter since some of the carriers travel away from the barrier. Furthermore, the barrier itself acts as a sink so that more carriers reach it than would be otherwise indicated. Grading the barrier, thereby building in a field, and increasing the bias voltage also cause more carriers to reach the barrier.

The diffusion length in semiconductors of the nature of silicon and germanium is a function of lifetime of generated carriers, the diffusion length increasing with the lifetime. For the exact relationship and illustrative values of lifetimes and diffusion lengths for injected carriers in germanium, see the Physical Review, volume 81, pages 637-638. Since, however, an error was made in the subscripts in the equations as reported in that article, the findings will be discussed briefly.

The diffusion length or distance through which it may be expected that $$\frac{1}{e}$$

of the injected carriers will travel, may be obtained from the equation $$L_n = \sqrt{D_n T_n} \quad (1)$$

The above equation is used for determining the diffusion length of minority or N-type carriers in P material and is the equation to be used in computing these values in a PNP device such as depicted in Figs. 1A and 1B. In the above equation $L_n$ = the diffusion length as above defined in units of centimeters.
$D_n$ = diffusion constant in units of cm.$^2$/sec.
$T_n$ = lifetime in seconds.

Fig. 2 of the reference above cited is accurate with the exception that the subscripts N and P should be interchanged in the Equation 1 forms appearing in the upper left- and upper right-hand corners of the plot of Fig. 2 of the reference. These subscripts represent the minority generated carriers so that the $n$ subscripts should be used when generation takes place in the P region.

Experimentally determined diffusion constants for germanium and silicon follow:

| Germanium | Silicon |
| --- | --- |
| $D_n$=93 cm.$^2$/sec.<br>$D_p$=44 cm.$^2$/sec. | $D_n$=31 cm.$^2$/sec.<br>$D_p$=6.5 cm.$^2$/sec. | where, as indicated above, $D_n$ is the diffusion constant for N-type carriers in the P region and $D_p$ is the diffusion constant for P-type carriers in the N region.

From the equations of the plot reported in the above cited reference to the Physical Review, it is seen that a carrier lifetime of about 10 microseconds results in a diffusion length of about 0.3 millimeter or about 12 mils. This value of 10 microseconds represents a carrier lifetime which at this stage of the development of the semiconductor art, is easily attainable. Carrier lifetimes as high as several hundred microseconds have been reported and it is expected that even these values will be exceeded in the near future. Such values present no difficulty since outer regions of like conductivity of the order of very few mils may be formed, for example, by diffusion of significant impurities, heat treatment, bombardment, remelting, alloy bonding or doping. Therefore, carrier lifetimes producing diffusion lengths far in excess of the minimum available layer thicknesses are readily obtainable.

Since all the considerations to be taken into account in determining the thicknesses of the outer regions of like conductivity type and the intermediate region of opposite conductivity type have been discussed above, it is seen that any suggestion as to actual dimensions is merely illustrative. As an example, it is seen that a PNP device such as that depicted in Figs. 1A and 1B of a total thickness of .1 centimeter and upwards and having P regions of a thickness of the order of 4 mils and downward will prove satisfactory where the wavelength of the light source is in the infra-red range of 1.8 microns or more down to the order of a hundred angstroms or less as in the X-ray and γ-ray regions. Where it is expected that the wavelength of the light source will approach the maximum wavelength which still contains sufficient photon energy so as to generate hole-electron pairs, it is advisable to keep the distance between the PN boundaries at a value of at least about 0.2 centimeter. This value in a specimen having outer regions of like conductivity type of thicknesses of the order of very few mils, will produce a sensitivity decrease of the order of only 10 per cent due to the transparency of the semiconductive body to the infra-red range.

Where the specimen is of very high purity so that the carrier lifetime produces a long diffusion length, little loss in efficiency is realized by increasing the thickness of the outer regions of like conductivity type; for example, where the carrier lifetime of N-type carriers in P-type germanium is of the order of 500 microseconds, the diffusion length, as worked out according to Equation 1 above, is of the order of .2 centimeter. Combining high lifetime with a light source of a wavelength of the order of 1.8 microns permits a still thicker outer region so that in germanium using a light source of 1.8 microns on an outer P region, the absorption distance of .1 centimeter may be added to the diffusion distance of about .2 centimeter for a high lifetime specimen resulting in a device having an outer region of a thickness of about .3 centimeter.

With the considerations which have been enumerated above, it is readily seen that a design equation allowing both for carrier lifetime and wavelength of the light source can be derived. If it be decided that an efficiency of the order of 30 per cent is acceptable and where the device is constructed of germanium with P-type conductivity outer regions, the design would vary from minimum center region thicknesses of the order of .2 centimeter and maximum outer region thicknesses of the order of .3 centimeter for a specimen having N-type carrier lifetimes of the order of 500 microseconds and with wavelength light source of the order of 1.8 microns down to center regions of minimum thicknesses of the range of microns, and outer regions of the order of a few tenths of a millimeter for specimens having lifetimes of the order of 10 microseconds and with the light source of wavelengths of the order of hundreds of angstroms. Where the purity of the material which is being used is not determinable or is not uniform and where the wavelength of the light source is to be variable through the visible spectrum and into the infrared spectrum, a good standard dimension of the intermediate region is of the order of .2 centimeter and that of the outer region, the minimum available.

Although it is known that every photon of light energy absorbed in a semiconductive material such as germanium or silicon has the advantage of generating one hole-electron pair providing that the photon energy is of at least the minimum values described elsewhere in this specification, one factor other than carrier lifetime should be taken into consideration in determining the efficiency of the light responsive device. It is known that a certain number of generated hole-electron pairs will recombine so that the minority generated carrier is not brought into the conduction band. It is known that recombination in materials such as germanium and silicon takes place both in the body of the material and the surface, and further, that in the untreated material the rate of recombination at the surface is far in excess of that within the body. Therefore, there have been developed and there are known to the art, several types of surface treatment designed to prevent this surface recombination. In the construction of devices designed in accordance with this invention, it is advisable to use one of these treatments. Two examples are the superoxol etch of United States Patent No. 2,542,727, issued December 29, 1949, and the etching process of R. D. Heidenreich, United States Patent No. 2,619,414, issued November 25, 1952. In addition and in conjunction to one of the surface treatments to which the two references are set forth, a surface of the material may be treated so as to increase the lifetime of the generated carriers and, therefore, so as to enhance the sensitivity of any one of the devices herein described. Attention is directed to the antimony oxichloride treatment described in the copending application of J. R. Haynes and R. D. Heidenreich, Serial No. 175,648, filed July 24, 1950. The etching process of the above-mentioned United States Patent No. 2,619,414 has the effect of making the surface of the device shining and, therefore, decreases the ratio of absorbed to reflected light. To minimize this effect it is conceivable that reflection reducing treatments such as the surface deposition of salt will also increase the sensitivity of a photoelectric transducer constructed in accordance with this invention.

Although most of the description contained herein has been directed to devices constructed of germanium and in which the outer regions are P-type and the intermediate regions N-type, it is to be understood that this invention is not to be limited to this configuration. Any one of the devices described herein may be constructed of any semiconductive material and further, the two outer regions may be either N or P providing the intermediate region is of opposite conductivity type.

The invention has been described above in terms of specific embodiments and since certain modifications and equivalents may be apparent to those skilled in the art, this description is intended to be illustrative of, but not necessarily to constitute a limitation upon, the scope of the invention.

What is claimed is:

1. A photoelectric translating device comprising a body of semiconductive material having therein a zone of first conductivity type between and contiguous with a pair of zones of a second conductivity type, terminal connections to said outer zones, and means for causing light to be absorbed within a distance of no more than one diffusion length from a junction of at least one of said outer zones with said middle zone, said light being of a frequency range of a minimum wavelength of about 100 angstroms and of a maximum wavelength corresponding with about the average bandwidth of the forbidden region of the semiconductive material, the shortest route between the two regions of the second conductivity type through the region of first conductivity type being at least about two absorption lengths.

2. A photoelectric translating device as described in claim 1 in which each of said pair of outer zones is of a maximum thickness of about one diffusion length.

3. A photoelectric translating device as described in claim 2, but in which the semiconductive material is germanium containing significant impurities and in which the light is of a wavelength of the range of from about 100 angstroms up to about 1.8 microns.

4. A photoelectric translating device as described in claim 2, but in which the semiconductive material is silicon containing significant impurities and in which the light is of a wavelength of the range of from about 100 angstroms up to about 1.2 microns.

5. A photoelectric translating device as described in claim 2 in which the semiconductive material is an element selected from the group consisting of silicon and germanium.

6. A photoelectric translating device as described in claim 2 in which the semiconductive material is an element selected from the group consisting of silicon and germanium containing significant impurities and in which the intermediate region is of a thickness of at least 0.2 centimeter and in which the pair of outer regions are of a thickness no greater than a few mils.

WILLIAM G. PFANN.

No references cited.